No. 812,911. PATENTED FEB. 20, 1906.
O. J. WYMAN, C. DENNETT & C. O. TINKHAM.
BARREL HEADING PRESS.
APPLICATION FILED JULY 20, 1905.
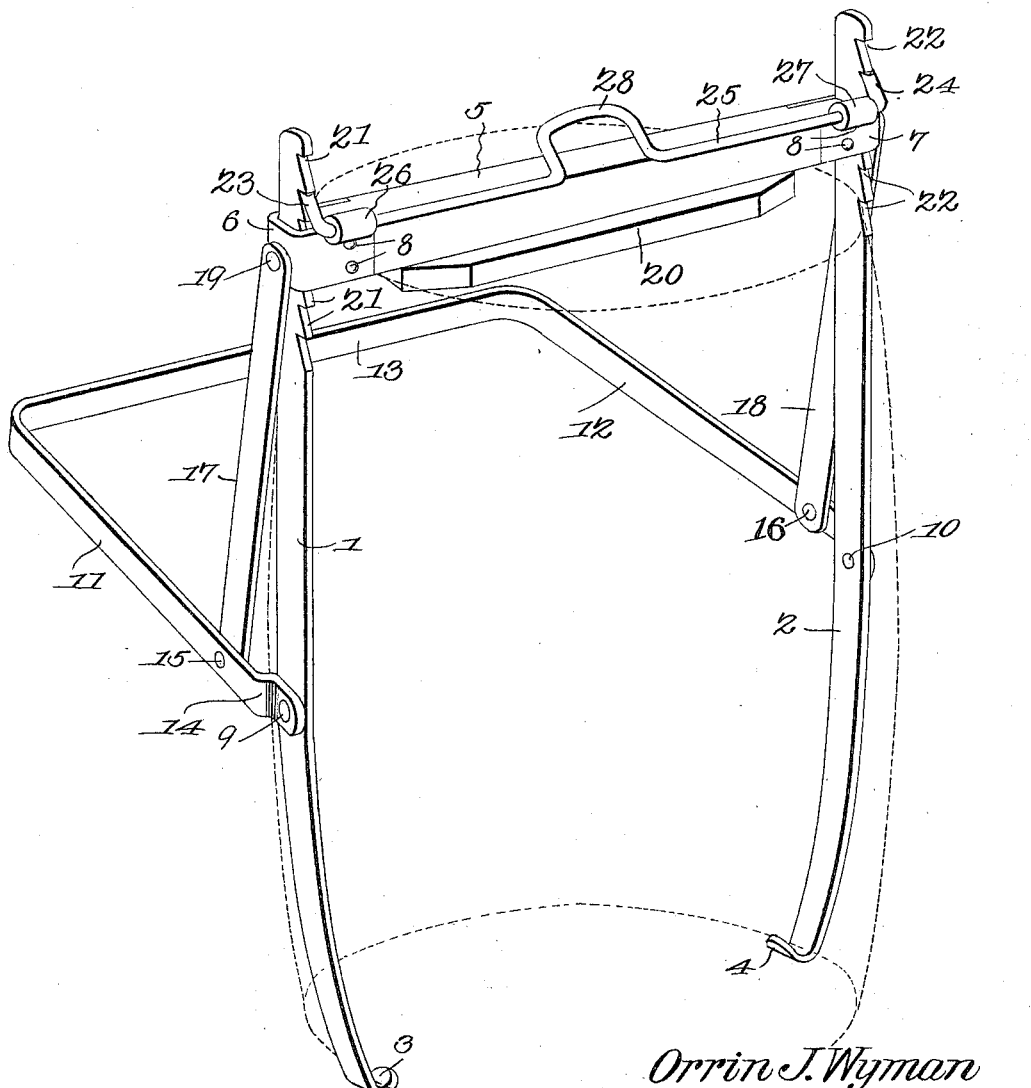
Orrin J. Wyman
Charles Dennett
Cortland O. Tinkham
Inventors
Witnesses
by C. A. Snow & Co.
Attorneys

UNITED STATES PATENT OFFICE.

ORRIN J. WYMAN, OF MEDINA, AND CHARLES DENNETT AND CORTLAND O. TINKHAM, OF AKRON, NEW YORK.

BARREL-HEADING PRESS.

No. 812,911.  Specification of Letters Patent.  Patented Feb. 20, 1906.

Application filed July 20, 1905. Serial No. 270,578.

*To all whom it may concern:*

Be it known that we, ORRIN J. WYMAN, residing at Medina, in the county of Orleans, and CHARLES DENNETT and CORTLAND O. TINKHAM, residing at Akron, in the county of Erie, State of New York, citizens of the United States, have invented a new and useful Barrel-Heading Press, of which the following is a specification.

This invention relates to barrel-heading presses, and while especially designed for use in the implacement of heads in barrels of fruit may be used with equally satisfactory results for heading other barrels, boxes, tubs, firkins, and the like.

The object of the invention is to provide a device of the kind embodying new and improved features of simplicity, cheapness, durability, and convenience.

A further object of the invention is to provide a simple device of the class wherein the head-pressing member is forced downward evenly and when the desired pressure has been obtained automatically hold the head while being nailed or otherwise secured.

A further object of the invention is to provide a device of the class which may be operated with equal facility from either side of the barrel, thereby making the implement more convenient of operation.

With these and other objects in view the present invention consists in the combination and arrangement of parts, as will be hereinafter fully described, shown in the accompanying drawings, and particularly pointed out in the appended claims, it being understood that changes in the form, proportion, size, and minor details may be made without departing from the spirit of the invention or sacrificing any of its advantages.

The drawing forming a part of this application represents in perspective the improved barrel-heading press mounted on a barrel in outline, and in its preferred embodiment comprises side bars 1 and 2, somewhat bowed to conform to the shape of the barrel and having at their lower ends hooks 3 and 4, arranged to hook beneath the bottom chime of a barrel. Upon the upper ends of the side bars is mounted the cross-bar 5 and arranged to slide vertically thereon by means of the clips 6 and 7, loosely embracing the bars 1 and 2 and secured to the cross-bar 5 in any approved manner, as by the rivets 8.

Pivoted to the side bars 1 and 2 at 9 and 10, points intermediate their ends, are the arms 11 and 12 of the U-shaped lever 13 and which are provided adjacent their pivoted ends with offsets 14. To the arms 11 and 12 at 15 and 16, points adjacent the offsets 14, are pivoted the links 17 and 18, which are in turn pivoted at their upper ends, as at 19, and to the clips 6 and 7 of the cross-bar 5. The U-shaped lever 13 is proportioned to swing on its pivots 9 and 10 above and over the tops of side bars 1 and 2 and cross-bar 5 and to operate in a similar manner upon either side of the barrel, and the cross-bar 5 being provided with a follower 20 to engage the head the head may be forced to seat from either side.

The side bars 1 and 2 are provided for a distance downward from their upper ends with the ratchet-notches 21 and 22, and upon the ends of the cross-bar are mounted the pawls 23 and 24, disposed for engagement with the notches 21 and 22. The pawls may be mounted and operated in any approved manner, as by forming them integral with a bar 25, pivotally mounted in ears 26 and 27 and having a central operating curve or offset 28. The ears 26 and 27 are for economy of cost and material preferably formed integral with the clips 6 and 7, and the offset 28 is of such form and weight as to automatically produce the engagement of the pawls 23 and 24 with the ratchet-notches 21 and 22 and to retain the cross-bar at the desired vertical adjustment while the head is being permanently secured and until manually disengaged by the manipulation of the offset 28.

Having thus described the invention, what is claimed is—

1. A barrel-heading press comprising a cross-bar having terminal upright guides, side bars slidable through the guides with their lower ends terminating in hooks and their upper ends provided with teeth, means extending between the cross-bar and the side bars to move the cross-bar upon the side bars, and connected pawls mounted upon the cross-bar for simultaneous engagement with the teeth of the side bars.

2. A barrel-heading press comprising a cross-bar having terminal guides, side bars slidable through the guides with their lower ends terminating in hooks and their upper ends provided with teeth, means for moving the cross-bar and the side bars, and a handled rock-bar mounted upon the cross-bar and carrying terminal pawls for simultaneous engagement with the teeth of the side bars.

3. A barrel-heading press comprising a cross-bar provided with terminal guides, side bars slidable through the guides with their lower ends terminating in hooks and their upper ends provided with teeth, means to move the cross-bar upon the side bars, and a rock-bar journaled upon the cross-bar, an intermediate portion of the rock-bar being bent into a crank-handle, and the terminals of the bar being bent to form pawls for simultaneous engagement with the teeth of the side bar.

4. A barrel-heading press comprising a cross-bar, substantially U-shaped clips embracing the ends of the bar and projecting beyond the same to form guide-openings, said clips being provided with bearing-eyes alined longitudinally of the cross-bar, side bars slidable through the guide-clips with their lower ends terminating in hooks and their upper ends provided with teeth, means for moving the cross-bar upon the side bars, and a rock-bar journaled in the eyes and provided with pawls engaging the teeth of the side bars.

5. A barrel-heading press comprising a cross-bar having terminal guides, side bars slidable through the guides with their lower ends terminating in hooks and their upper ends provided with teeth, means for moving the cross-bar upon the side bars, and a rock-bar journaled upon the cross-bar and provided with a handle and pawls lying upon the same side of the bar, the pawls being disposed for simultaneous engagement with the teeth of the side bars, and the handle constituting a weight to yieldably maintain the pawls in engagement with the teeth.

6. A barrel-heading press comprising a cross-bar, substantially U-shaped clips embracing the ends of the cross-bar and projecting beyond the latter to form guide-openings, said clips being provided with alined bearing-eyes at one side of the cross-bar, side bars slidable through the guide-openings with their lower ends terminating in hooks and their upper ends provided with teeth, means for moving the cross-bar upon the side bar, and a rock-bar journaled in the bearing-eyes, the terminals of the bar being bent into pawls for simultaneous engagement with the teeth of the side bars, and an intermediate portion of the rock-bar being bent into a handle lying upon the same side of the rock-bar as the pawls.

7. A barrel-heading press comprising a cross-bar proportioned to bear upon the head of a barrel and provided with clips at its extremities, upright side bars slidably embraced by and extending above the clips and provided with ratchet-teeth at their upper extremities, hooks formed upon the lower ends of the side bars to engage beneath a barrel, a U-shaped lever having its arms pivoted by their extremities to the side bars, links pivotally connecting the arms of the lever and the cross-bar to move the cross-bar vertically upon the side bars, and connected pawls carried upon the cross-bar to simultaneously engage the ratchet-teeth of both side bars.

8. In a barrel-heading press, side bars arranged to engage beneath the bottom chime of and extend at opposite sides above the barrel and having ratchet-notches formed adjacent their upper ends, a cross-bar provided at each end with a clip loosely embracing the side bars, a substantially U-shaped lever with each free end pivoted to one of the side bars intermediate its ends and proportioned to pivotally swing above the upper ends of the side bars and the cross-bar, a link connecting each end of the cross-bar with the lever adjacent its pivoted ends, and connected pawls pivotally mounted upon the cross-bar and arranged to engage the ratchet-notches of the side bars.

In testimony that we claim the foregoing as our own we have hereto affixed our signatures in the presence of two witnesses.

ORRIN J. WYMAN.
CHARLES DENNETT.
CORTLAND O. TINKHAM.

Witnesses:
A. Pearle Westley,
W. T. Dorraner.